United States Patent [19]

Butler et al.

[11] Patent Number: 5,640,240

[45] Date of Patent: Jun. 17, 1997

[54] PROBE FOR SURFACE MEASUREMENT

[75] Inventors: Clive Butler, Kings Langley; Gregorios Gregoriou, London, both of England

[73] Assignee: British Technology Group Ltd., London, England

[21] Appl. No.: 185,845

[22] PCT Filed: Jul. 24, 1992

[86] PCT No.: PCT/GB92/01373

§ 371 Date: Jun. 27, 1994

§ 102(e) Date: Jun. 27, 1994

[87] PCT Pub. No.: WO93/02337

PCT Pub. Date: Feb. 4, 1993

[30] Foreign Application Priority Data

Jul. 25, 1991 [GB] United Kingdom ............ 9116115

[51] Int. Cl.[6] ............................................. G01B 11/14
[52] U.S. Cl. ............. 356/375; 250/227.11; 250/201.2
[58] Field of Search ............................ 356/375, 376, 356/373; 250/227.11, 205, 227.28, 201.2, 201.3, 201.7, 227.4

[56] References Cited

U.S. PATENT DOCUMENTS

| | | |
|---|---|---|
| 3,940,608 | 2/1976 | Kissinger et al. ............... 250/227.11 |
| 4,629,324 | 12/1986 | Stern ................................ 356/376 |
| 4,640,620 | 2/1987 | Schmidt ........................... 356/376 |
| 4,674,882 | 6/1987 | Dorman et al. ................. 356/373 |
| 4,965,442 | 10/1990 | Girod et al. ................. 356/376 X |

FOREIGN PATENT DOCUMENTS

| | | |
|---|---|---|
| WO8907037 | 8/1989 | WIPO. |
| WO9010195 | 9/1990 | WIPO. |
| WO9015306 | 12/1990 | WIPO. |

OTHER PUBLICATIONS

Journal Of Lightwave Technology, vol. 9, No. 4, Apr. 1991, pp. 545–551, Gang He et al; "A Light Intensity Function Suitable For Multimode Fiber–Optic Sensors.

Soviet Journal of Quantum Electronics, vol. 18, No. 10, Oct. 1988, pp.1295–1298, L.I. Zhmurova et al: "Coherent Optical System With a Synthetized Aperture For Determination Of Geometric Parameters Of an Object".

Primary Examiner—K. Hantis
Attorney, Agent, or Firm—Cushman, Darby & Cushman IP Group of Pillsbury Madison & Sutro LLP

[57] ABSTRACT

A surface-measuring apparatus comprising a probe and means for moving the probe towards and away from a surface under examination and for monitoring such movement, the probe comprising a plurality of closely spaced light-collecting elements arranged in a light-collecting plane, lens means positioned to produce a sharply focussed image of said light collecting elements at an image plane movable relative to said surface by movement of the probe, illuminating means so arranged that the lens unit forms an illuminated spot image of it in the image plane in co-incidence with the image In the image plane of one of the light-collecting elements, and means for measuring the incidence of light on the said one of the light-collecting elements and on surrounding ones of those elements. In one embodiment (FIG. 1) the probe incorporates a bundle of, say, seven optical fibers which each have one end exposed at an end plane of the bundle and constituting a respective one the light-collecting elements, the fibers being connected at their other ends to photodiodes or other photodetector means for measuring the Incidence of light on the exposed ends of the fibers. In another embodiment, the light-collecting elements are the individual detector cells comprised in the detector array of a solid state camera, the cells being organized in groups each having a central cell and a plurality of surrounding cells, and the illuminating means may be a screen with appropriately located apertures illuminated from behind.

14 Claims, 5 Drawing Sheets

PROBE FOR SURFACE MEASUREMENT

This invention relates to apparatus for carrying out measurements to establish the form or profile, or the texture, of a surface.

Traditionally, the measurement of surface form has been effected by means of mechanical sensors or probes which make contact with the surface being investigated and which, though yielding accurate results, are inherently slow in operation and limited in spatial resolution. There have therefore been various proposals and attempts to make use of optical sensors in the measurement of surface form, since these in general can have higher speeds of operation than mechanical probes and, moreover, they do not make mechanical contact with the surface and both the probe and the surface are thereby protected from possible damage or deformation. However, optical probes (including fiber-optic probes) are not widely used, principally because the performance of such probes of known kinds is strongly affected by variations in the reflectivity, scattering properties and surface texture characteristics of the surface under investigation. This severely limits the range of applicability of such probes: typically, problems are encountered in attempting to employ optical probes in the measurement of surfaces which are matt black or highly polished or are of such materials as perspex or nylon.

It is an object of the present invention to provide apparatus, which includes a fiber-optic or comparable optical probe, for carrying out measurements to establish the form, profile or texture of a surface and of which the performance is in large measure independent of the reflectivity of such surface.

According to the invention there is provided surface-measuring apparatus comprising a probe and means for moving the probe towards and away from a surface under examination and for monitoring such movement, the probe comprising a plurality of closely spaced light-collecting elements arranged In a light-collecting plane, lens means positioned to produce a sharply focussed image of said light collecting elements at an image plane movable relative to said surface by movement of the probe, illuminating means so arranged that the lens unit forms an illuminated spot image of it in the image plane in co-incidence with the image in the image plane of one of the light-collecting elements, and means for measuring the incidence of light on the said one of the light-collecting elements and on surrounding ones of those elements.

In one embodiment of such apparatus, the probe incorporates a bundle of, say, seven optical fibers which each have one end exposed at an end plane of the bundle and constituting a respective one of the light-collecting elements, the fibers being connected at their other ends to photodiodes or other photodetector means for measuring the incidence of light on the exposed ends of the fibers. The fiber whose one end constitutes the said one of the light-collecting elements may be coupled both to the respective photodetector means and to a source of illumination, which may be a laser diode, whereby the one end of the fiber also constitutes the illuminating means. Alternatively, between the lens means and the light-collecting plane in which the light-collecting elements are disposed there may be interposed a beam splitter which enables the illuminating means to be physically separate, constituted for example by an optical fiber having one of its ends coupled to the laser diode and its other end positioned so that its Image in the beam splitter is superposed on the said one of the light-collecting elements.

In another embodiment of apparatus according to the invention, the light-collecting elements are the individual detector cells comprised in the detector array of a solid state camera. The detector cells of such an array may be organized in groups each having a central cell and a plurality of surrounding cells, and the illuminating means may be a screen with appropriately located apertures illuminated from behind, so placed relative to a beam-splitter arranged between the detector array and the lens means that the images of the illuminted apertures in the beam splitter coincide with the central cells of the respective groups.

The invention will be more fully understood from the following description of preferred embodiments thereof with reference to the accompanying drawings, in which.

Figure 1:
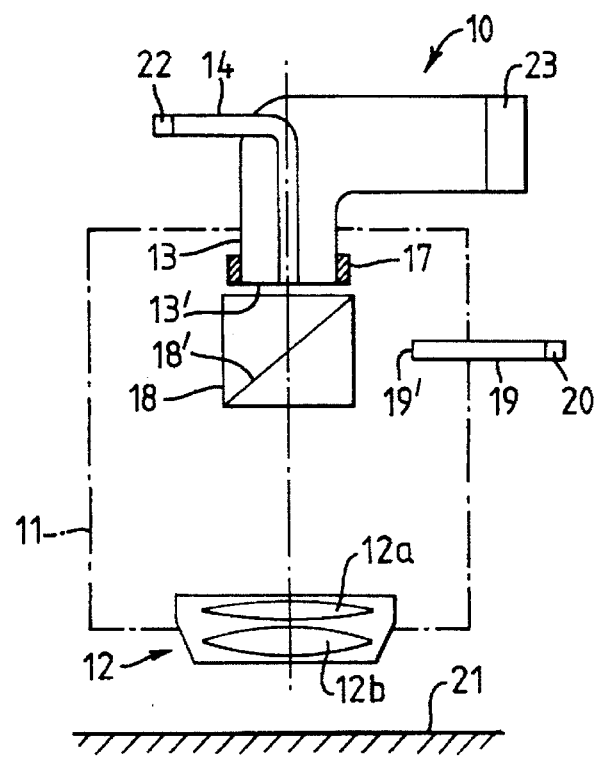
FIG. 1 is a schematic representation of a probe of apparatus according to the invention, positioned over a surface of which the form or profile is to be measured by means of the apparatus.
Figure 5:
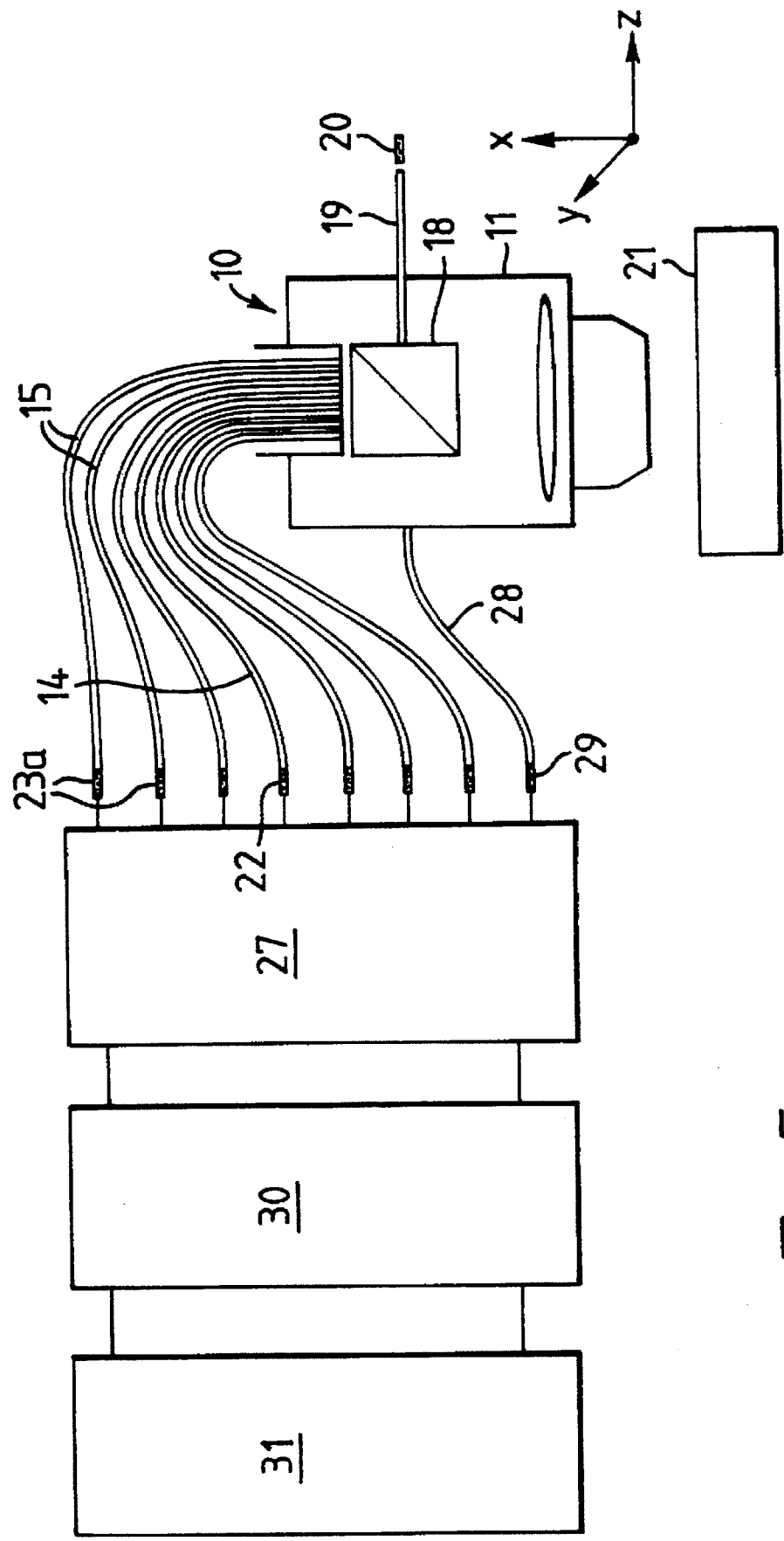
Figure 6:
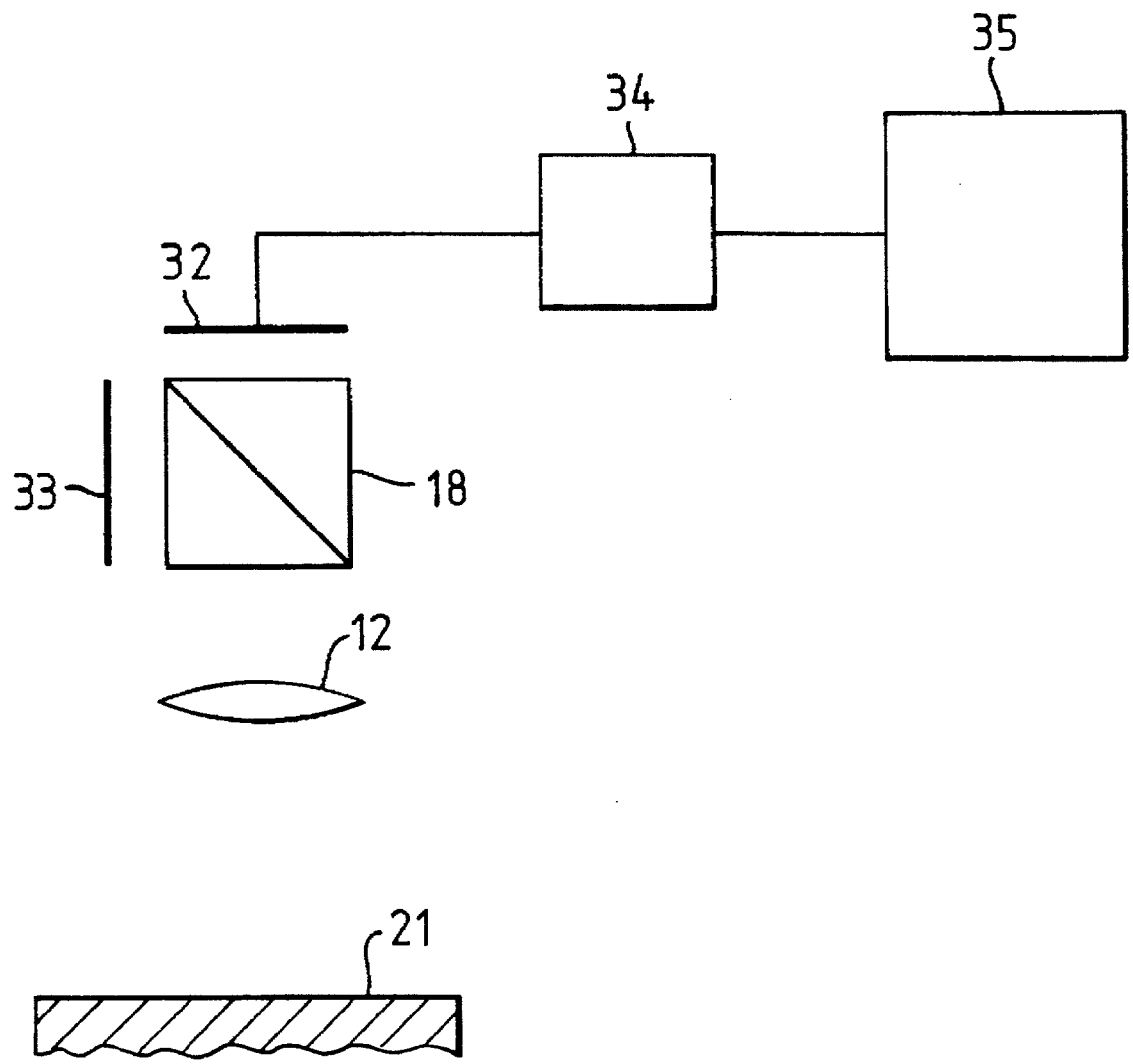

FIG. 5 is a schematic representation of apparatus which incorporates a probe similar to that shown in FIG. 1 but including modifications; and FIG. 6 is a schematic representation of an embodiment of apparatus according to the invention, having a probe which incorporates, instead of optical fibers with associated detector cells, a solid-state camera detector array having a large number of individual detector cells.

Figure 2:
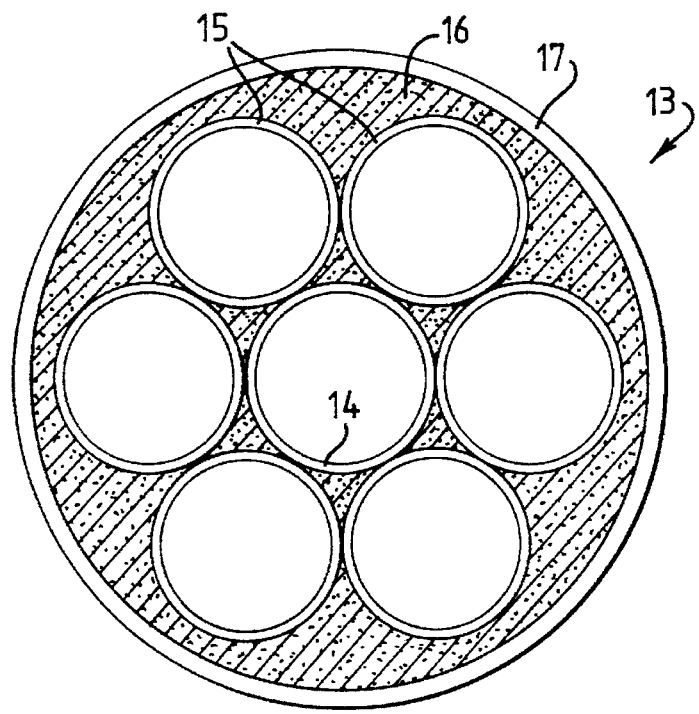
FIG. 2 is an end view, on a larger scale, of a bundle of optical fibers comprised by the probe shown in FIG. 1.

The optical probe shown schematically in FIG. 1 and indicated generally by reference numeral 10 comprises a mechanical housing 11 having a front wall in which is mounted a lens unit 12, which is shown as consisting of a pair of lenses 12a and 12b though these can be regarded as effectively constituting a single lens. Also mounted in the housing 11, coaxial with the lens unit 12, is one end of an optical fiber bundle 13 composed, as shown in FIG. 2, of a central circular-section fiber 14 and six outer circular-section fibers 15 secured in a uniform hexagonal array about the fiber 14, all the fibers being of equal diameters of, say, 0.5 mm. The fibers, exposed at an end face 13' of the bundle 13, as shown in FIG. 2, may be polymer Eska fibers and may be embedded In a matrix 16 of glue or cement, within a surrounding ferrule 17 by means of which the end face 13' may be positively located relative to the lens unit 12.

Mounted In the housing 11 between the lens unit 12 and the end face 13' of the fiber bundle is a beam splitter 18, and a further optical fiber 19 is so mounted in the housing that an image of its end face 19' in the beam splitting surface 18' of the beam splitter 18 coincides with the end face of the fiber 14 in the end face 13' of the fiber bundle 13.

At its end remote from its end face 19', the fiber 19 is coupled to a source of illumination, which may be a laser diode 20, and light from this source emerging from the fiber end face 19' is reflected in the beam splitter 18 and passes through the lens unit 12, as if It had emanated from the fiber 14, to provide a spot of illumination on a surface 21 which Is to be investigated. Light from the illuminated spot, passing again through the lens unit 12 and through the beam splitter 18, is incident on the end face 13' of the bundle 13, and in general (as will be explained below) enters both the central fiber 14 of the bundle and the outer fibers 15. For sensing this light, the fiber 14 at its end remote from the end face 13' is coupled to a photo-detector 22, and the fibers 15 are similarly coupled to a photo-detector 23.

The fiber 19 and beam splitter 18 enable light to be launched into the system as though from the fiber 14, and in an alternative but equivalent arrangement the laser diode 20 may in fact be coupled to the fiber 14 which then serves both to launch light into the system and to receive light back. In that alternative, the beam splitter 18 and the fiber 19 are omitted. It is then necessary to provide, in known manner, a coupler by means of which the fiber 14 is coupled both to the laser diode 20 and to the photo-detector 22; but the omission of the beam splitter means that this modification has considerable advantage in practice since the probe can be made much smaller, and cheaper.

Figure 3:
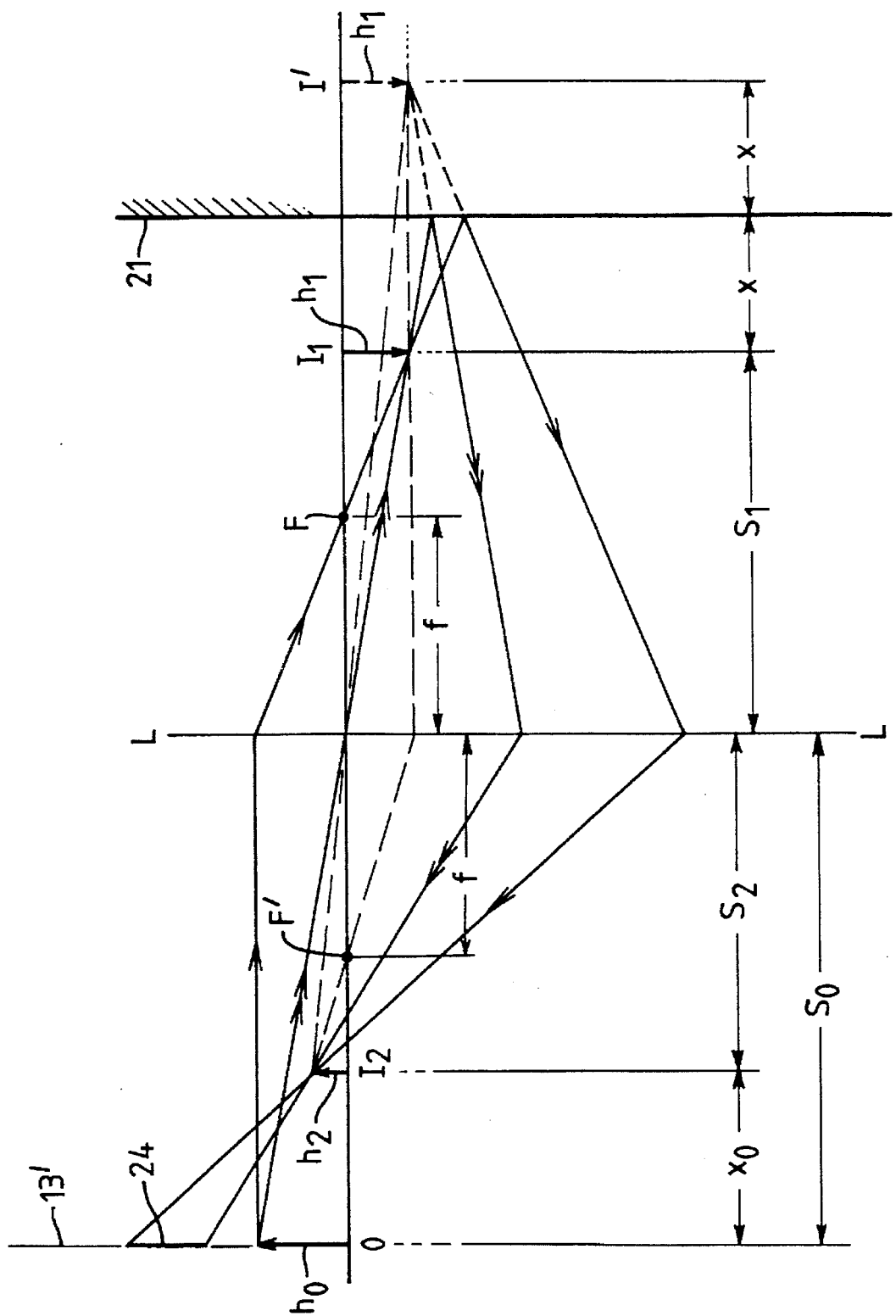
FIG. 3 is a ray diagram relating to the formation of optical images by the probe shown in FIG. 1.

The optical behaviour of the probe shown in FIG. 1 may be explained by reference, first, to FIG. 3, in which the lens unit 12 is represented by a thin lens of focal length f, in the plane LL and with focal points F and F', and O is an object in the end plane 13' of the fiber bundle 13. If the object distance of the object O is $S_o$, the lens forms an image $I_1$ at an image distance $S_1$, where $$1/S_1 = 1/S_o + 1/f. \qquad (1)$$

Supposing the surface 21 is more distant, by a distance x, from the lens plane LL than is the image $I_1$, and that the surface 21 is mirror-reflective, then the light focussed by the lens to form the image $I_1$ is reflected by the surface 21 and re-enters the lens as though it had emanated from a virtual image $I'$ of the image $I_1$, the image $I'$ being at a distance $S_1+2x$ from the lens. The lens forms a further image $I_2$ of the image $I'$, the image $I_2$ being at a distance $S_2$ from the lens, where $$1/S_2 = 1/(S_1+2x) - 1/f \qquad (2)$$

and thus at a distance $x_o$ from the end plane 13' of the fiber bundle 13, where $$x_o = S_o - S_2. \qquad (3)$$

Substitution In equation (3) of expressions for $S_o$ and $S_2$ derived from equations (1) and (2) give:

$$x_o = 2xf^2/(S_1-f)\cdot(S_1+2x-f). \qquad (4)$$

If $h_o$, $h_1$ and $h_2$ are the heights of the object O and of the image $I_1$ (and $I'$) and $I_2$ respectively, then:

$$h_1/(S_1-f) = h_o/f$$

and $$h_2/S_2 = h_1/(S_1+2x)$$

from which:

$$h_2 = h_o(S_1-f)S_2/f(S_1+2x)$$

or, substituting for $S_2$ the expression which may be derived from equation (2) above, $$h_2 = h_o(S_1-f)/(S_1+2-f). \qquad (5)$$

It will be seen that equations (4) and (5) define both the position and the size of the image $I_2$ in terms of x, and thus of the position of the surface 21 relative to the probe 10, since f and $S_o$ (and therefore also $S_1$) are fixed values. It will be seen also that if the probe 10 is positioned such that the image $I_1$ is actually focussed on the surface 21, so that x=0, the result is that $x_o=0$ and $h_2=h_o$, which means that the image $I_2$ is formed in the end plane 13' of the fiber bundle 13 and coincides with the object of which it is an image. Thus, if the probe is positioned so that light launched from the central fiber 14 (or, equivalently, from the fiber 19 as shown In FIG. 1) is focussed into an image $I_1$ on the surface 21 (i.e. x=0), the light reflected back though the lens to form the image $I_2$ is focussed in the end plane 13' of the fiber bundle 13 entirely on the end of the fiber 14 and none of the reflected light falls on the ends of the outer fibers 15.

Figure 4:
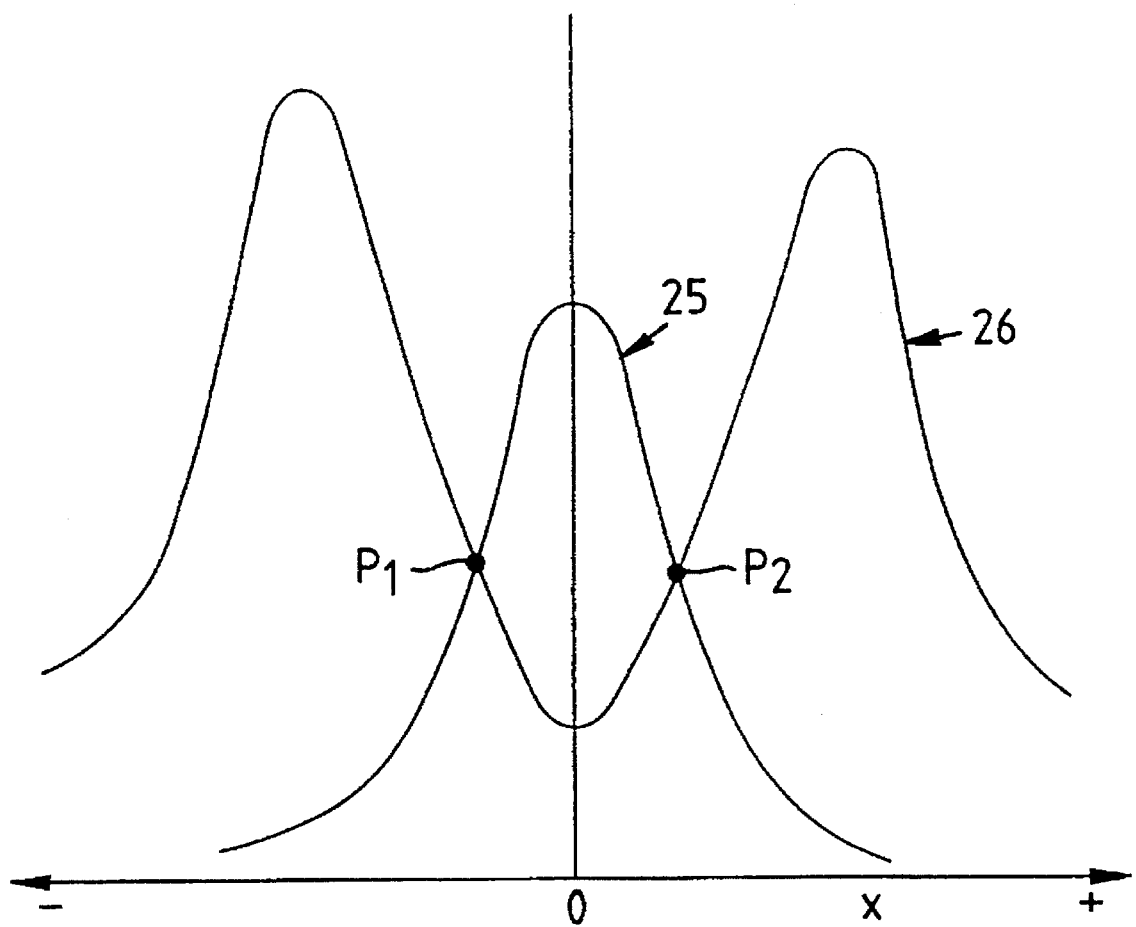
FIG. 4 shows curves relating to the distribution of light on the end of a bundle of optical fibers comprised by the probe shown in FIG. 1.

If the probe is moved, relative to the surface 21, so that it is no longer the case that x=0, the image 12 is no longer focussed in the plane 13' and some of the light forming this image will now be incident on that plane outside the region of the original object O. Thus, as shown in FIG. 3, light focussed at the arrow point of the image $I_2$ is incident on the plane 13' at a region 24 where it forms a blurred Image of the arrow point at a greater off-axis distance than the corresponding arrow point of the original object O. Thus some of the light from the fiber 14 (or 19) Is returned, if the surface 21 is not at the position at which the image $I_1$ is formed, not to the central fiber 14 but to the outer fibers 15. This effect is shown in FIG. 4, In which the curve 25 shows how the intensity of light received by the fiber 14 and sensed by the sensor 22 is greatest when x=0 and falls off as the probe 10 is moved from that position towards or away from the surface 21, whereas, as shown by the curve 26, the light incident on the outer fibers 15 and sensed by the sensor 23 is a minimum (zero, in the absence of diffuse scattering) for x=0 and rises to maxima on either side of the x=0 position before falling off again at greater positive and negative values of x.

The equations (4) and (5) above were derived on the assumption that the surface 21 is a specularly reflective surface. If the surface 21 reflects only diffusely, the image $I_2$ is the image formed by the lens unit 12 not of the virtual image $I'$ but of a blurred-image patch of illumination of the surface 21 itself (at an object distance of ($S_1$+x) instead of ($S_1$+2x)) for the image $I'$. In that case, the equations (4) and (5) no longer apply but corresponding expressions for $x_o$ and $h_2$, the position and height of the image $I_2$, in terms of x, which defines the position of the surface 21, are obtainable, thus:

$$x_o = xf^2/(S_1-f)\cdot(S_1+x-f) \qquad (6)$$

and $$h_2 = \{A.F.x + h_o S_1(S_1-f)\}/S_1(S_1+x-f) \qquad (7)$$

where A is the aperture of the lens unit 12. It will be seen that in this case, also, $x_o=0$ and $h_2=h_o$ when x=0, so that light emitted from the central fiber 14 will be imaged again only on that fiber and not on the fibers 15 when the surface 21 is positioned to have the image $I_1$ focussed sharply upon it. For non-zero values of x, the situation Is again as represented by the curves 25 and 26 of FIG. 4; and the same is true for surfaces 21 intermediate between the specularly and diffusively reflective cases considered.

As shown in FIG. 4, the curves 25 and 26 intersect in two points $P_1$ and $P_2$, corresponding with two positions of the probe 10, at different distances from the surface 21, at which the light entering the fiber 14 and detected by the photo-detector 22 is equal to that entering the fibers 15 and detected by the photo-detector 23. Comparison of the output signals of the photo-detectors 22 and 23 enables a difference or error signal to be derived, which may then be used to control a motor arranged to move the probe towards or away from the surface 21 and maintain it at a constant distance corresponding to a particular value of x. If, then, a further drive means is provided for moving the probe along the surface 21, the surface profile along a line on the surface may be scanned automatically by measuring the movements of the probe in the direction towards and away from the surface while the probe is driven in the direction across the surface.

In another mode of operation, the probe may be driven towards and away from the surface repeatedly, at spaced points thereof. In this mode, at each approach of the probe to the surface, the two output signals from the detectors 22 and 23 first become equal as the point $P_2$ is reached, and this event may be used either as a measure of the position of the surface or to trigger the onset of a reduced speed of approach, so that the point $P_1$, at which the detector outputs are again equal, is reached at low speed and can thus be detected with Increased accuracy, as the measure of the surface position.

The use of the probe according to the invention in either of these ways, or in other ways which are also possible, is relatively unaffected by the degrees of reflectivity and absorptivity of the surface to be measured, because these qualities affect almost equally the amounts of light reflected into the central and outer fibers 14 and 15 respectively, and it is only the ratio between these amounts which is significant. Although $P_1$ and $P_2$ have been referred to as the points at which the photo-detectors 22 and 23 have equal outputs, these outputs will usually be compared after amplification; and they may If desired be amplified with differently chosen amplification factors so as, effectively, to choose the parts of the two curves 25 and 26 at which they intersect one another. By this means it is possible to select those parts of the curve with the greatest rate of change, thereby achieving high sensitivtty.

The relative shapes of the curves 25 and 26 and, in particular, the distance apart, in the x-direction, of the two maxima of the curve 26, are to some extent dependent on the degree of diffuseness of the reflectivity of the surface 21, and immunity of the results obtained to error from this cause can be minimised, if desired, by measuring both the $P_1$ and the $P_2$ positions and calculating and using the mean or, more accurately, the weighted mean of the two values rather than the actual measured value of either one of them.

It will be understood that the resolution of the system depends both on the magnification produced by the lens unit and on the cross-sectional area of the optical fibers, and that apparatus according to the Invention which may be employed, for example, to measure both surface form or profile and surface texture may be provided with interchangeable lens units and/or fiber bundles to vary the system resolution as appropriate.

In the probe shown in FIG. 1, the light captured by all the outer fibers 15 is summed by a single photo-detector 23, but in a more sophisticated arrangement the outputs from the fibers 15 may be measured individually. Such an arrangement is shown in FIG. 5, in which similar parts are indicated by the same reference numerals as In FIG. 1. The central fiber 14 is coupled to a photo-detector 22, as before, but each of the outer fibers 15 is coupled to a separate respective photo-detector 23a, and the outputs of the detector 22 and all the detectors 23a are fed to amplifying and processing circuitry 27. In addition, a fiber 28 having an end mounted in the side of the probe housing 11 picks up light from the fiber 19 which is not deflected by the beam splitter 18 and this, detected by a photo-detector 29, provides a reference signal which is also fed to the circuitry 27. The data provided by the circuitry 27 are transferred via a data acquisition card 30 to a computer 31, which may suitably be a personal computer, and there stored and processed, together with data relating to the position of the probe 10 which is supplied to the card 30 by means (not shown) for moving the probe in x and y directions over the surface 21 and in the z direction towards and away from it. If the outputs of the individual detectors 23a are summed together, this apparatus can operate as described with reference to FIG. 1; but the possibility of analysing the information available from the outer fibers 15 individually also enables information to be gathered relating to local inclination as well as height of the surface 21.

In another modification within the scope of the invention, a probe according to the invention may include a plurality of bundles of fibers, each with its light source, so that parallel sets of measurements may be made simultaneously of different parts of the surface 21. In yet another modification, shown schematically in FIG. 6, the optical fibers 14 and 15 are replaced by a solid-state camera detector array 32 having a large number of individual detector cells, in rows and columns, which are organized in groups each having a central cell and a plurality of surrounding outer cells. For example, each group may be a 3×3 block of cells, with one central cell surrounded by eight outer cells. An illumination array 33, via the beam splitter 18 and lens unit 12, provides on the surface 21 being examined a pattern of illuminated spots which, if the surface is positioned such that the spots are sharply focussed on it, are in turn sharply imaged only on the central cells, and not on the outer cells, of the groups in the detector array 32. The outputs from all the cells of the array 32 are then converted to digital form using a frame store 34, and transferred to a computer 35 capable of analysing the data to produce a contour map or other representation (e.g. a perspective map) of the surface 21.

We claim:

1. Surface-measuring apparatus comprising a probe and means for moving the probe towards and away from a surface under examination and for monitoring such movement, the probe comprising:

a plurality of closely spaced light-collecting elements arranged in a light-collecting plane, lens means positioned to produce a sharply focused image of said light-collecting elements at an image plane movable relative to said surface by movement of the probe, illuminating means so arranged that the lens means forms an illuminated spot image of the illuminating means in the image plane in coincidence with the image in the image plane of one of the light-collecting elements, means for measuring the incidence of light which is reflected from a surface under examination on the one of the light-collecting elements and on surrounding ones of those elements, and means for comparing the measured incidence of light on said one of the light-collecting elements with the measured incidence of light on said surrounding ones of said elements.

2. Surface-measuring apparatus as claimed in claim 1, further comprising a bundle of optical fibers, each optical fiber having one end exposed at an end plane of the bundle and constituting a respective one of the light-collecting elements, the fibers being connected at their other ends to photodiodes or other photodetector means for measuring the incidence of light on the exposed ends of the fibers.

3. Surface-measuring apparatus as claimed in claim 2, wherein the illuminating means comprises a source of illumination coupled to the other end of the one of the optical fibers whose said one end constitutes the one of the light-collecting elements.

4. Surface-measuring apparatus as claimed in claim 1 or claim 2, wherein the illuminating means is physically separate from the light-collecting elements and there is interposed between the lens and the light-collecting elements a beam splitter which is so positioned relative to the illuminating means that an image of said illuminating means in the beam splitter is superimposed on the one of the light-collecting elements.

5. Surface-measuring apparatus as claimed in claim 1, wherein the light-collecting elements are individual detector cells forming a detector array of a solid state camera, the detector cells of the array being organized in groups each having a central cell and a plurality of surrounding cells.

6. Surface-measuring apparatus as claimed in claim 2, wherein the bundle of optical fibers comprises a central optical fiber surrounded by six optical fibers spaced at regular intervals around the central optical fibers.

7. Surface-measuring apparatus as claimed in claim 1, wherein the comparing means includes means for producing a difference signal from the measured incidence of light on said one of the light-collecting elements and the measured incidence of light on said surrounding ones of said elements, said moving means being controlled in accordance with the difference signal to maintain the probe at a substantially constant distance from a surface under examination.

8. Surface-measuring apparatus as claimed in claim 7, wherein said distance is such that the image plane is not coincident with the surface under examination.

9. A method of measuring the form of a surface using a probe having lens means and a plurality of closely spaced light-collecting elements arranged in a light-collecting plane, the method comprising the steps of:

positioning the lens means to produce a sharply focused image of said light-collecting elements at an image plane movable relative to said surface by movement of the probe, forming with the lens an illuminated spot image in an image plane in coincidence with the image in the image plane of one of the light-collecting elements, measuring the incidence of light which is reflected from the surface on the one of the light-collecting elements and on surrounding ones of those elements, and comparing the measured incidence of light on said one of the light-collecting elements with the measured incidence of light on said surrounding ones of said elements.

10. A method according to claim 9, wherein the light-collecting elements comprise a bundle of optical fibers.

11. A method according to claim 10, wherein the spot image is produced by a source of illumination coupled to the other end of the one of the optical fibers whose said one end constitutes the one of the light-collecting elements.

12. A method according to claim 9, wherein the spot image is produced by illuminating means which is physically separate from the light-collecting elements, the illuminating means directing light through a beam splitter interposed between the lens and the light-collecting elements, the beam splitter being so positioned relative to the illuminating means that an image of said illuminating means in the beam splitter is superimposed on the one of the light-collecting elements.

13. A method as claimed in claim 9, including the step of producing a difference signal from the measured incidence of light on said one of the light-collecting elements and the measured incidence of light on said surrounding ones of said elements, and controlling the movement of the probe in accordance with the difference signal to maintain the probe at a substantially constant distance from a surface under examination.

14. A method according to claim 13, wherein said distance is such that the image plane is not coincident with the surface under examination.

* * * * *